United States Patent [19]
Schmutz et al.

[11] Patent Number: 6,011,582
[45] Date of Patent: Jan. 4, 2000

[54] TELECINE WITH DUAL DIGITIZERS AND MULTIPLE SCANNING BEAMS

[75] Inventors: Lawrence E. Schmutz, Watertown; Jeffrey Yorsz, Winchester, both of Mass.

[73] Assignee: Adaptive Optics Associates, Inc., Cambridge, Mass.

[21] Appl. No.: 09/036,347

[22] Filed: Mar. 6, 1998

Related U.S. Application Data

[62] Division of application No. 08/384,998, Feb. 7, 1995, Pat. No. 5,808,669.

[51] Int. Cl.[7] ...................................................... H04N 7/18
[52] U.S. Cl. ................................................................ 348/97
[58] Field of Search ................................. 348/96, 97, 99, 348/103, 106, 107

[56] References Cited

U.S. PATENT DOCUMENTS

| | | | |
|---|---|---|---|
| 3,767,852 | 10/1973 | Horowitz | 348/103 |
| 3,778,545 | 12/1973 | Metzger | 348/103 |
| 4,807,039 | 2/1989 | Fenton | 358/214 |
| 4,823,204 | 4/1989 | Holland | 358/347 |
| 4,866,511 | 9/1989 | Belmares-Sarabia et al. | 358/27 |
| 4,875,102 | 10/1989 | Poetsch | 348/106 |
| 4,903,131 | 2/1990 | Lingemann | 348/106 |
| 4,920,419 | 4/1990 | Easterly | 348/97 |
| 5,018,019 | 5/1991 | Moore, Jr. | 358/215 |
| 5,191,413 | 3/1993 | Edgar | 358/105 |
| 5,194,958 | 3/1993 | Pearman et al. | 348/214 |
| 5,265,200 | 11/1993 | Edgar | 395/131 |
| 5,266,805 | 11/1993 | Edgar | 250/330 |
| 5,282,063 | 1/1994 | Deacon et al. | 358/479 |
| 5,319,742 | 6/1994 | Edgar | 395/131 |
| 5,392,080 | 2/1995 | Galt et al. | 353/84 |
| 5,557,332 | 9/1996 | Millward | 348/100 |

FOREIGN PATENT DOCUMENTS

| | | |
|---|---|---|
| 3736789 | 5/1989 | Germany . |
| 60-052184 | 3/1985 | Japan . |
| 5191813 | 7/1993 | Japan . |
| 1232133 | 5/1971 | United Kingdom . |
| 2281166 | 2/1995 | United Kingdom . |

OTHER PUBLICATIONS

D. Poetsch & A. J. Cosgrove "A Digital CCD Telecine for HDTV", Image Technology, Apr. 1994, Journal of the BKSTS, 76 (1194) Apr., No. 3, Longon, GB, pp. 53–54 and 58.

*Primary Examiner*—Bryan Tung

[57] ABSTRACT

The present invention teaches an improved parallel telecine for converting a plurality of recorded images or frames of film, defined by a first and a second set of frames of film, to a digital data stream. The improved telecine comprises a plurality of image transfer or digitizing systems for respectively digitizing each of the recorded images or frames of film or groupings of frames of film. Each image transfer and digitizing system comprises an illuminator system for illuminating the respective frames or groupings of frames, and a camera system for converting the image of the respective frame or groupings of frames into a digital data stream. Each camera sensor additionally comprises a position sensor for detecting a first and a second pair of edges on a coordinated positional tag at the edge of the film frame. Further, each camera system comprises an aligning mechanism for aligning each camera system in response to the set of edges of the respective coordinated position tag detected by the position sensor.

3 Claims, 7 Drawing Sheets fig. 3a
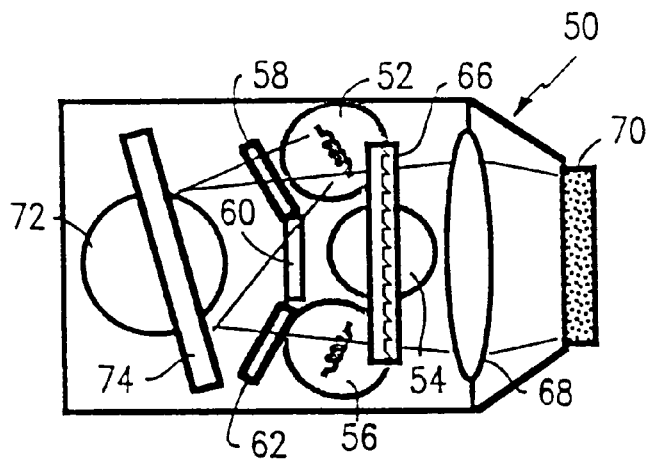
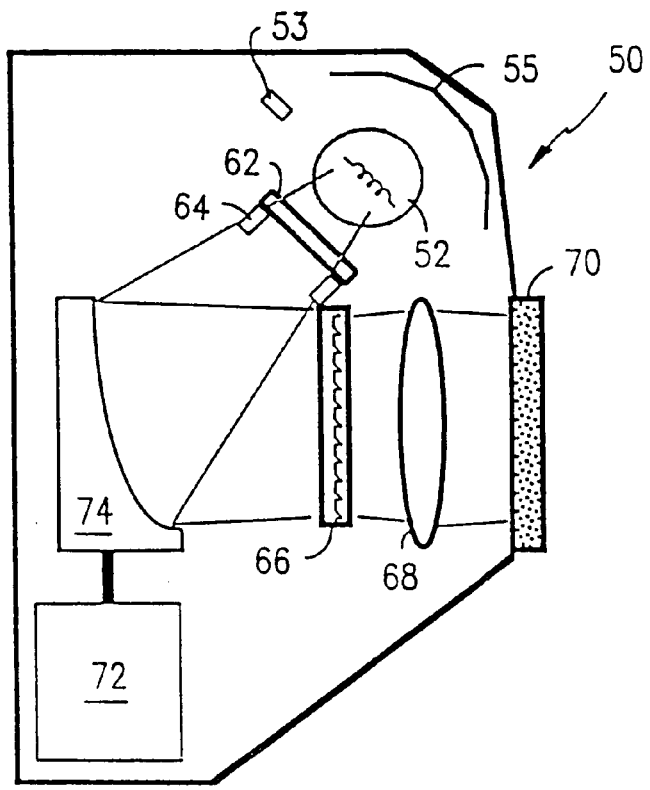
fig. 3b

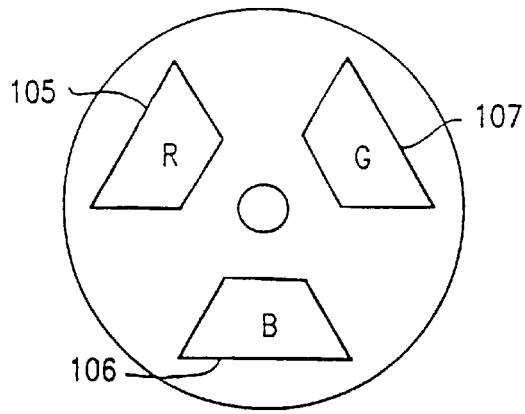
*fig. 4 a*
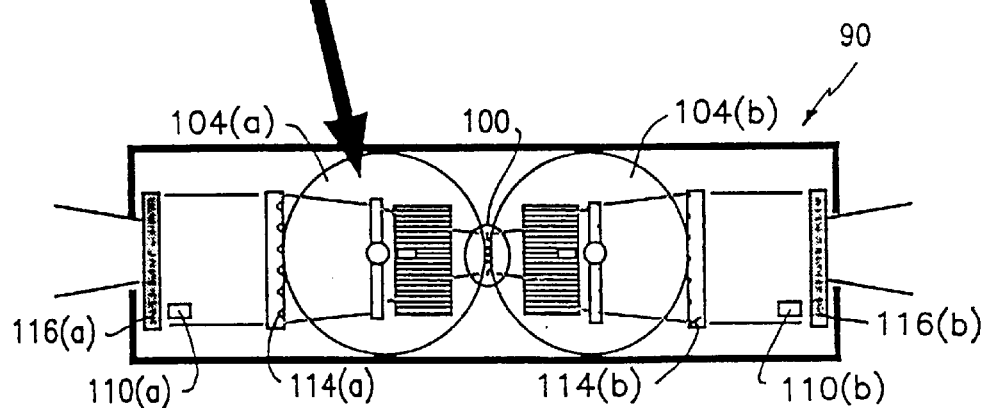
*fig. 4 b*
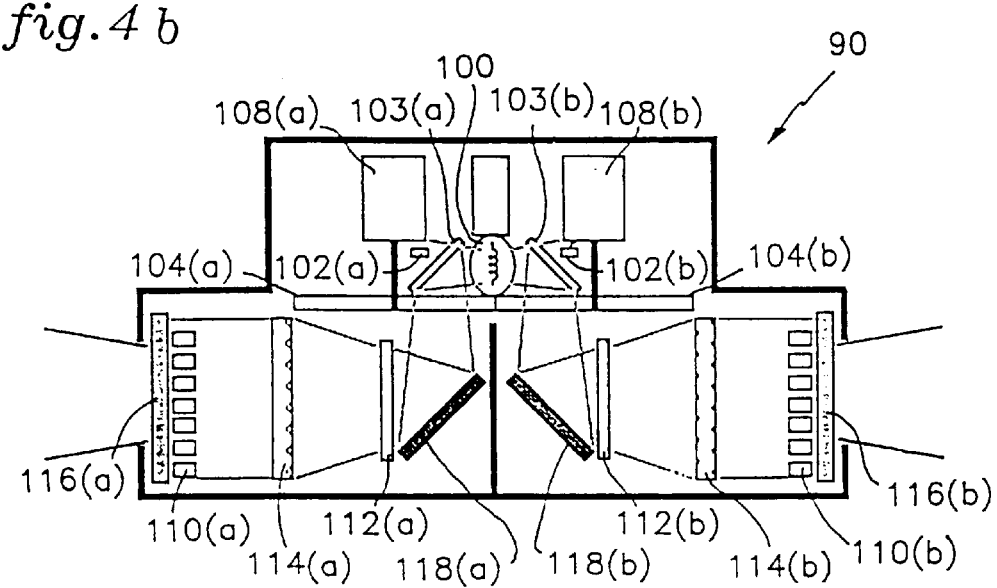

TELECINE WITH DUAL DIGITIZERS AND MULTIPLE SCANNING BEAMS

This application is a divisional of prior application Ser. No. 08/384,998, filed Feb. 7, 1995, now U.S. Pat. No. 5,808,669.

TECHNICAL FIELD

This invention relates to the field of telecines, and more particularly, to a system and method for digitizing recorded images.

BACKGROUND ART

New technologies are for the first time making the concept of digitizing full-length feature films feasible using an instrument known in the film industry as a telecine. Originally, the conversion from recorded film to an electronic format was realized in a process essentially analogous to television recording. Recorded film was first uniformly illuminated and the image frames then recorded using a conventional television image tube. In a similar approach, the film frames were scanned by imaging a CRT onto each frame, while recording the output intensity.

With the advent of analog-to-digital (A/D) converter technology, transforming image signals in real time and performing image processing has become more viable. However, until the development of commercially cost effective, high density digital storage media, the image output had to be reconverted back to analog form for recording.

Further improvement has been obtained in the digitization process of recorded films with the maturation of high quality solid state detectors. One such detector is a Charge Coupled Device ("CCD") array. Having increased sensitivity, CCD arrays enable several features including frame capturing. CCDs also decouple the A/D conversion process, with the exposure and readout steps being executed as separate procedures.

Together with high performance processing and digital storage advances, the state-of-the-art of telecine has now advanced to The Cineon® system by Kodak®. This known telecine design captures digital film information at near film-grain resolution, allows image manipulation using digital workstations, and stores the results on digital tape.

The Cineon® system, however, has several shortcomings. It is relatively slow with respect to the capture and storage of images. In this regard, one of the bottlenecks of the system can be found in the telecine image conversion system, which utilizes a single trilinear CCD array for image capture. Various additional improvements may also be incorporated, to improve the system's performance, including conversion from film to digital form, manipulation and correction of the digital imagery, compression of the resulting data stream, and storage on a high-capacity, low error rate electronic medium.

Thus, a need exists for an improved telecine having a higher conversion accuracy at a lower cost. Further, a demand remains for an improved telecine having a higher throughput without multiport pattern noise. Moreover, an improved telecine is also of interest to industry which has lower speed film handling to thereby reduce the risks associated with the digital conversion of valuable archival master recordings. There is a further demand for an improved telecine having a longer dwell time per frame enabling the use of slower optical components and thereby reducing cost. Similarly, an improved telecine having a maximized uniform frame illumination is also needed by industry for reducing post acquisition processing. Finally, an improved telecine which records exposure conditions, as well as the state of the recording equipment and film, along with the actual image data, is of great interest to industry for digital archiving purposes.

DISCLOSURE OF THE INVENTION

The primary advantage of the present invention is to provide an improved telecine which overcomes the limitations of the known art.

A further advantage of the present invention is to provide an improved telecine having a higher conversion accuracy at a lower cost.

Still another advantage of the present invention is to provide an improved telecine having a higher throughput without multiport pattern noise.

Yet another advantage of the present invention is to provide an improved telecine having lower speed film handling, thereby reducing the risk associated with the digital conversion of valuable archival master recordings.

Yet still another advantage of the present invention is to provide an improved telecine having a longer dwell time per frame enabling the use of slower optical components and thereby reducing cost.

Yet still another advantage of the present invention is to provide an improved telecine having a maximized uniform frame illumination, thereby reducing post acquisition processing.

Yet still another advantage of the present invention is to provide an improved telecine capable of recording the exposure conditions, as well as the state of the recording equipment and film, along with the actual image data.

In order to achieve the advantages of the present invention, an improved telecine is disclosed for the simultaneous parallel conversion of a plurality of recorded images or frames of film or groupings of frames of film into a digital data stream. The improved telecine comprises a plurality of image transfer or digitizing systems for respectively digitizing each of the recorded images or frames of film or groupings of frames of film. Each image transfer and digitizing system comprises an illuminator system for illuminating the respective frames or groupings of frames, and a camera system for converting the image of the respective frame or groupings of frames into a digital data stream. Each camera sensor additionally comprises a position sensor for detecting a first, second, third and fourth edge of a coordinated positional tag on each recorded image of the film frame. Further, each camera system comprises an aligning mechanism for aligning each camera system in response to the set of edges of the respective coordinated position tag detected by the position sensor.

In a further embodiment of the invention, an improved telecine is disclosed for the simultaneous parallel conversion of a plurality of recorded images or frames of film or groupings of frames of film into a digital data stream. The improved telecine comprises a plurality of image transfer or digitizing systems for respectively digitizing each of the recorded images or frames of film or groupings of frames of film. Each image transfer and digitizing system comprises an illuminator system for illuminating the respective frames or groupings of frames, and a system for characterizing the exposure conditions produced by the illuminator systems. Moreover, each image transfer and digitizing system also comprises a camera system for transferring the image of the respective frame or groupings of frames onto a linear, trilinear or multidimensional CCD array, and digitizing the output of each of the CCD arrays. The camera sensor additionally comprises a position sensor for detecting a first and a second pair of edges of a coordinated positional tag. The coordinated positional tag itself comprises a sprocket hole at the edge of the film frame. Further, each camera system comprises an aligning mechanism for aligning each camera system in response to the set of edges of the respective coordinated position tag detected by the position sensor. Finally, each camera system also comprises a digitizer and data feeder for feeding the respective CCD array outputs, the output of the camera position sensor, the output of the system for characterizing the exposure conditions, and information gathered by other sensors on the state of the overall system to an external parallel digital recording system.

In a further embodiment of the present invention, an illuminator system for illuminating a plurality of recorded images is disclosed. The illuminator system comprises a first, second and third light source generating a first, second and third light beam. Further, the illuminator system comprises a first, a second and a third color filter for colorizing the first, second, and third light beam respectively, as well as an output lens system. The illuminator system moreover comprises a coupling system for selectively coupling each of the first, second, and third light sources individually with the output lens system.

In still a further embodiment of the present invention, an illuminator system for illuminating a plurality of recorded images is disclosed. The illuminator system comprises a light source for generating an input light beam, a filter wheel comprising a first, a second and a third color filter, and a filter wheel motor for selectively coupling each of the first, second and third color filters individually with the input light beam, such that a first, a second and a third colorized light beam are individually generated. Additionally, the illuminator system comprises an output lens system and a coupling system for coupling each of the first, second and third individually generated colorized light beams with the output lens system.

In still another embodiment of the present invention, an illuminator system is disclosed for illuminating a plurality of recorded images. The illuminator system comprises a set of sensors and color filters for recording the exposure conditions of the illuminator system.

In yet another embodiment of the present invention, an alignment system is disclosed for aligning each of a plurality of camera systems its respective image of a plurality of recorded images in a telecine. The alignment system comprises a position sensor for detecting a first and a second pair of edges of a sprocket hole tag of each recorded image of the plurality. Furthermore, the alignment system comprises an alignment mechanism for aligning each of the camera systems with its respective recorded image of the plurality.

In yet another embodiment of the present invention, a calibration system is disclosed for calibrating each camera sensor of the improved telecine relative to one another. The calibrating system is employed for calibrating a gray scale, a color scale, or a magnification scale of a first camera sensor of a first digitizer with a second camera sensor of a second digitizer. The calibration system comprises a test frame comprising at least one of a gray field reference pattern, a color reference pattern, and a magnification reference pattern. By this design, the first and second digitizers both digitize the same reference pattern from the test frame. Further, the calibration system also comprises a computer system for compensating for fluctuations in the gray scale, color scale, or magnification scale between the first camera sensor of the first digitizer and the second camera sensor of the second digitizer in response to the reference pattern of the test frame digitized by the first and second digitizers.

BRIEF DESCRIPTION OF THE DRAWINGS

The present invention will be better understood from reading the following description of non-limited embodiments, with reference to the attached drawings, wherein below:

FIGS. 3(a) and 3(b) illustrates a top view and a cross sectional view of a third embodiment of the present invention;

FIGS. 4(a) and 4(b) illustrates a top view and a cross sectional view of a fourth embodiment of the present invention;

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
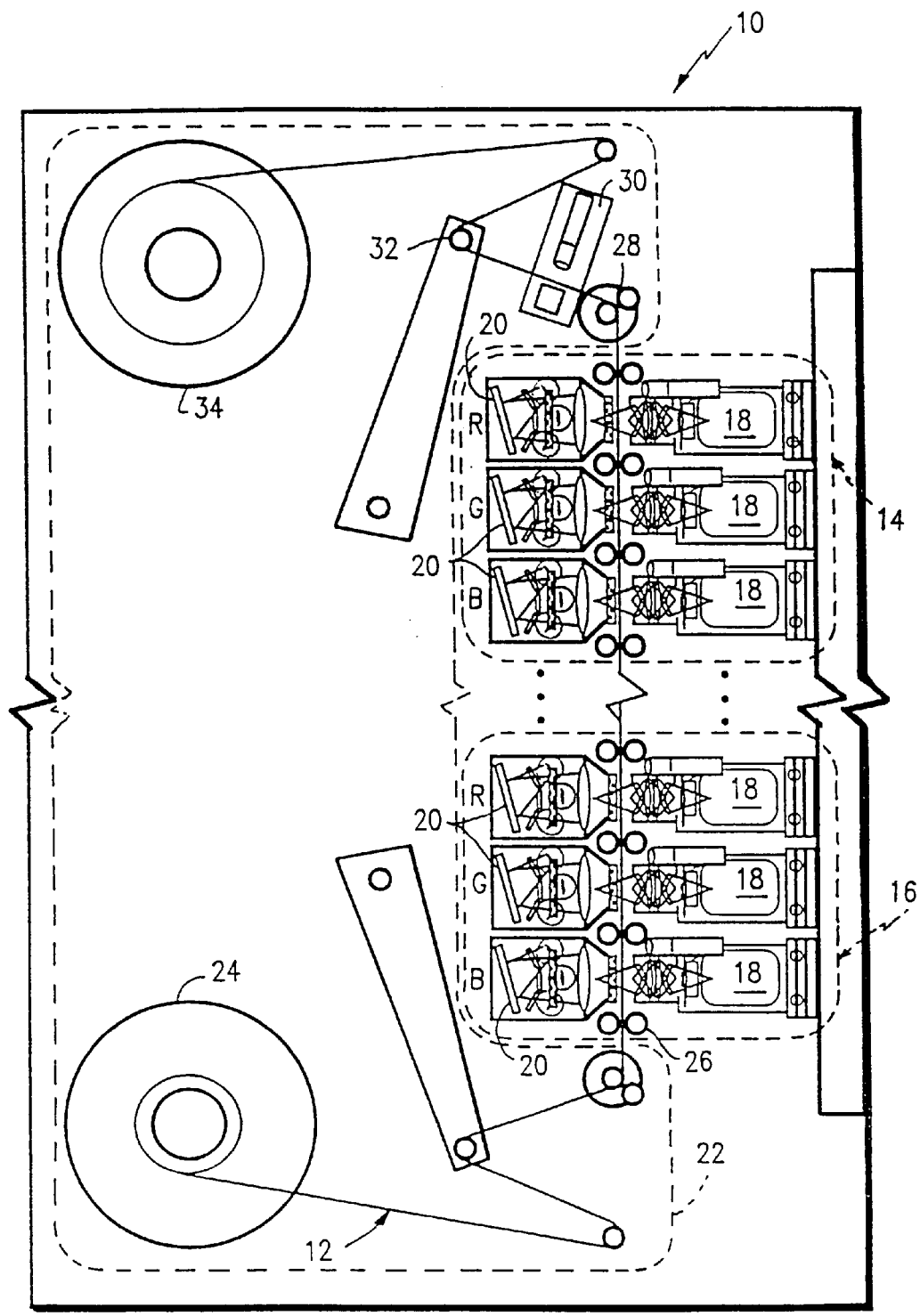
FIG. 1 illustrates a first embodiment of the present invention.

Referring to FIG. 1, a parallel telecine 10, or system for converting a plurality of recorded images or frames of film 12 to a respective plurality of digital data stream, is illustrated according to a first embodiment of the present invention. As will become evident hereinbelow, parallel telecine 10 performs this image to digital data conversion in a two phase parallel manner. This two phase parallel telecine design is intended to record several images simultaneously so as to achieve a reduction in the time of digitizing a full length feature film. Further, while the focus of the present invention is on a colorized parallel telecine, it should be apparent that a monochromatic system may be devised utilizing the teachings of the invention detailed hereinbelow.

To realize this two phase parallel configuration, film 12 is defined by a first and a second set or grouping of frames. Corresponding to the first and second set are a first and a second digitizer, 14 and 16, respectively, incorporated in parallel telecine 10, such that each digitizer digitizes its respective set. In the preferred embodiment of the present invention, first and second digitizers each comprise a Charge Coupled Device ("CCD") and associated an analog to digital converter.

First and second digitizers, 14 and 16, each comprise an illuminator system 18 for illuminating the plurality of frames within the respective set of frames of film 12 and a sensor camera 20 for digitizing the respective set and for generating a digital data output. Each sensor camera 20 in turn comprises a position sensor and an aligning mechanism, both detailed hereinbelow and illustrated in FIGS. 5 and 6, respectively. The position sensor functionally detects a first, second, third and fourth edge of each coordinated positional tag, or sprocket hole, associated with each frame of film 12. In response to detecting the edges, the aligning mechanism aligns camera sensor 20 with respect to its respective frame of film 12.

By aligning each camera sensor 20 to its respective frame of film 12, in contrast with aligning each frame of film 12 with its respective cam era sensor 20, several benefits are derived. Firstly, a cost savings is realized as fewer multiple precision mechanical alignments components are required. Second, there is a substantial reduction in the risk of deforming the film, as well as the size of the telecine, by aligning camera sensor 20 with respect to its respective frame of film 12. This is attributed to an otherwise significant amount of slack and/or idler loops required between each camera of another parallel telecine design. In aligning the camera sensor 29 with the film 12, a reduction in the wear of the overall system is additionally realized in view of the reliance on sensors and aligners, as opposed to known telecine designs which rely more heavily on the mechanical integrity of alignment pins and sprocket holes. Moreover, by utilizing the position sensor and aligning mechanism of the present invention, proper image alignment may still be achieved irrespective of damage to the sprocket holes.

Parallel telecine 10 also comprises a feeder 22 for feeding the first and second sets of frames of film 12 into each of the first and second digitizers. Feeder 22 comprises several subcomponents including a film source reel 24, a film guider 26, a torque motor 28, a film position sensor 30, an idler 32, and a film takeup reel 34.

In a further embodiment, parallel telecine 10 also comprises a data storage system (not shown). The storage system functionally enables archiving of the digital data outputs from both digitizers.

Figure 2:
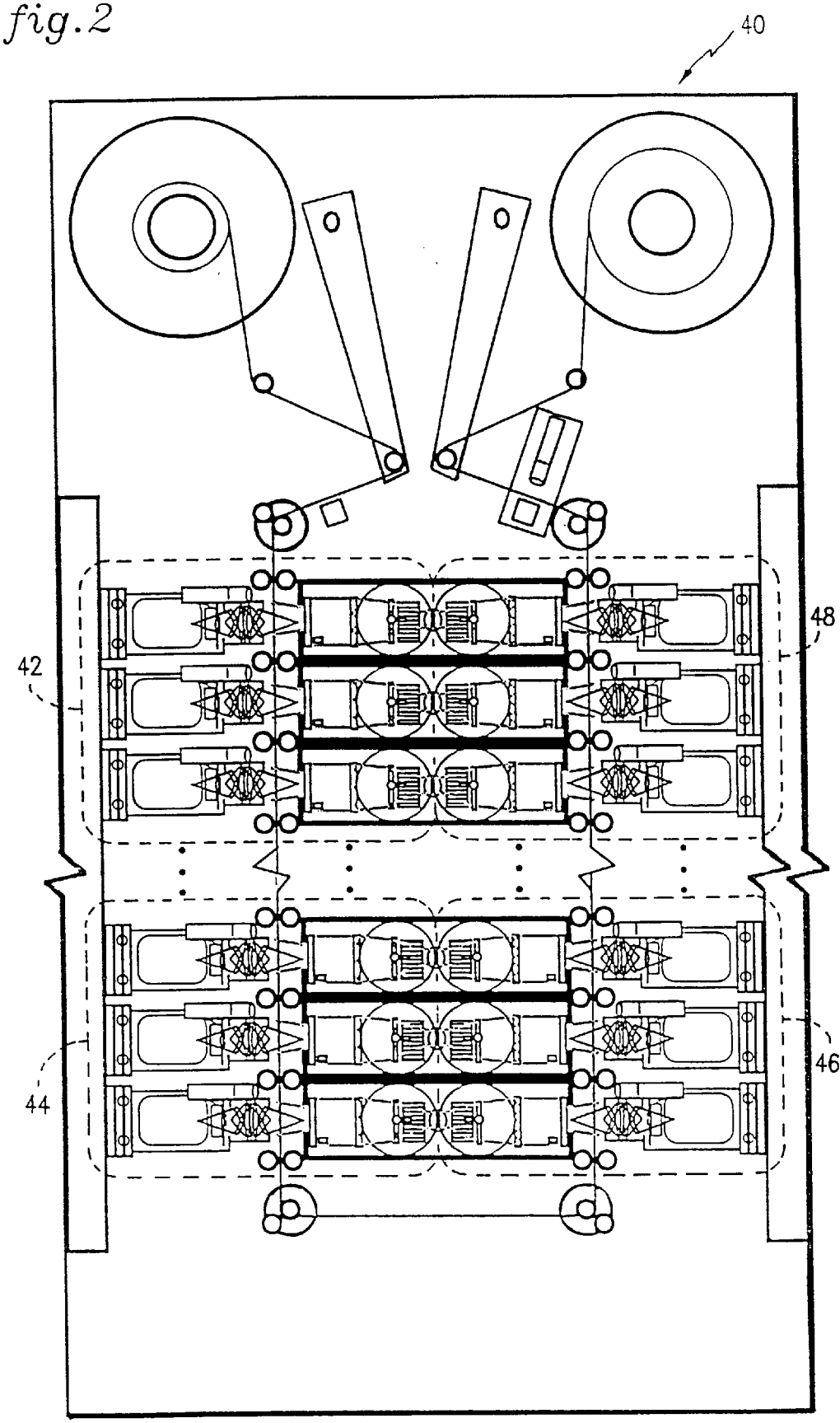
FIG. 2 illustrates a second embodiment of the present invention.

Referring to FIG. 2, a parallel telecine 40 is illustrated according to a second embodiment of the present invention. Here, a parallel telecine 40 comprises a first, second, third and fourth digitizer, 42, 44, 46, and 48, respectively, to realize a four phase parallel arrangement. This multiphase parallel telecine design is intended to record multiple images simultaneously so as to achieve a substantial reduction in the time of digitizing a full length feature film. In a further embodiment, one design for multiphase parallel telecine converts 24 images simultaneously to expedite digitizing the film.

Referring to FIGS. 3(a) and 3(b), an illumination system 50 is illustrated from a top and cross-sectional view according to a third embodiment of the present invention. Illumination system 50 functionally illuminates recorded images or frames of film 12. While designed to be incorporated in a parallel telecine structure such as the arrangement detailed hereinabove and illustrated in FIGS. 1 and 2, it should be apparent to one of ordinary skill in the art that illumination system 50 has various other applications which require the illumination of recorded images.

Illumination system 50 comprises a first, a second and a third light source, 52, 54, and 56, for generating a first, second and third light beam, respectively, to sequentially illuminate each recorded image or frame of film with a red (R), green (G) or blue (B) light. Each R, G and B light beam illuminate a camera sensor which is read out to provide a data record. The data record comprises information regarding the red, green or blue color content of the respective recorded image or frame of film. Light source, 52, 54, and 56 may comprise any lamp having a sufficient intensity to allow the light beams to pass through the film.

In an alternate embodiment of the present invention, illumination system 50 additionally comprises a light intensity detector 53 for detecting the light intensity of the light beam of the relevant light source. A light reflector 55 is also incorporated to reflect all misdirected energy back into the desired direction. Detector 53 serves two functional purposes. Firstly, it maintains a constant mean illumination level throughout the length of the reel of recorded images or frames of film. In response to the detected light intensity, a feedback control loop (not shown) is included for adjusting the relevant light source's light intensity accordingly. Moreover, detector 53 additionally provides a reference with respect to the exposure conditions of the illuminator during the telecine's operation. This information may be used once the film has been digitized to compensate for fluctuations in the operation of the illumination system 50.

Optically coupled with and corresponding to first, second and third light sources, 52, 54, and 56, are a first, a second and a third color filter, 58, 60 and 62. Color filters, 58, 60 and 62, each comprise one color from the red, green, blue group to enable proper reformation of the image captured on the particular frame of film 12. As a result of their relationship with light sources 52, 54, and 56, color filters, 58, 60 and 62 each generate a colorized first, second and third light beam.

In a further alternate embodiment of the present invention, each of the color filters comprises an infrared absorber (not shown). The infrared absorber functionally absorbs excess infrared energy generated by the relevant light source to prevent damage to recorded image.

In still a further alternate embodiment of the present invention, illumination system 50 additionally comprises a color analysis detector 64. Color analysis detector 64, in cooperation with a relevant color filter, detects the color quality of the emanating relevant light beam. Given the digital nature of the output results of the parallel telecine, fluctuations in the color quality may be compensated after film 12 is digitized.

Illumination system 50 also comprises an output lens system. The output lens system comprises several components, including a microoptic illumination flattener 66, a collimating lens 68 and a diffuser 70. Microoptic illumination flattener 66 functionally flattens the colorized light beam input into the output lens system, while collimating lens 68 collimates the colorized light beam flattened by the microoptic illumination flattener 66. Finally, diffuser 70 diffuses the collimated and flattened colorized light beam. It should be noted that microoptic illumination flattener 66, collimating lens 68 and diffuser 70 may have alternate arrangements and positions relative to one another without impacting on their functionality.

Furthermore, illumination system 50 comprises a coupling system for selectively coupling each color filter 62 with the output lens system. The coupling system comprises a scanning motor 72 for selectively coupling the output lens system with one of the color filters, 58, 60 or 62. Further, the coupling system comprises an off-axis ellipsoidal mirror 74 for transmitting to the output lens system the colorized light beams generated by the color filter selectively coupled with the output lens system. To realize this arrangement with the output lens system, scanner motor 74 rotates and repositions ellipsoidal mirror 72 between colors filters, and the resultant reflected beam is then directed towards the output lens system.

Referring to FIGS. 4(a) and 4(b), an illumination system 90 is illustrated from a top and cross-sectional view according to a fourth embodiment of the present invention. Illumination system 90 functionally illuminates recorded images or frames of film 12. While designed to be incorporated in a telecine structure such as the arrangement detailed hereinabove and illustrated in FIGS. 1 and 2, it should be apparent to one of ordinary skill in the art that illumination system 90 has various other applications which require the illumination of recorded images.

Illumination system 90 comprises a light source 100 for generating a light beam to simultaneously illuminate a first and second recorded image. As such, in the multiphase parallel telecine structure of FIG. 2, illumination system 90 is preferred. It should be noted, however, that light source 100 may be used to illuminate a single recorded image as in the configuration of FIGS. 3(a) and (b).

In an alternate embodiment of the present invention, illumination system 90 comprises a first and second light intensity detector 102(a) and 102(b) for detecting the light intensity of the light beams of light source 100. Detectors 102(a) and 102(b) serve two functional purposes. Firstly, they maintain a constant mean illumination level throughout the length of the reel of recorded images or frames of film. In response to the detected light intensity, a feedback control loop (not shown) is included for adjusting the relevant light intensity of light source 100. Moreover, detectors 102(a) and 102(b) additionally provide a reference with respect to the exposure conditions of the illuminator during the telecine's operation. This information may be used once the film has been digitized to compensate for fluctuations in the operation of the illumination system 90.

Coupled with light source 100 are filter wheels 104(a) and 104(b) and filter wheel motors 106(a) and 106(b). Each of filter wheels 104(a) and 104(b) comprise three filters, 105, 106, and 107, each of which comprise one color from the red, green, blue group to enable proper reformation of the images captured on the particular frames of film 12. Further, filter wheel motors 106(a) and 106(b) selectively couple light source 100 with a filter from each filter wheel by means of a cold mirror 103(a) and 103(b). Each cold mirror transmits the energy generated by light source 100 to its respective filter wheel, while transmitting excess infrared energy into safe parts of the illuminator away from the film. Further, each filter wheel motor rotates and repositions its corresponding filter wheel into alignment with light source 100 such that a first, second and third colorized light beam are selectively generated.

In a further alternate embodiment of the present invention, instead of using cold mirrors, each of the color filters comprises an infrared absorber (not shown). The infrared absorber functionally absorbs excess infrared energy generated by the relevant light source to prevent damage to recorded image.

In still a further alternate embodiment of the present invention, illumination system 90 additionally comprises a first and second color analysis detector, 110(a) and 110(b). Each color analysis detector, in cooperation with each color filter, detects the color quality of the emanating relevant light beam. Given the digital nature of the output results of the telecine, fluctuations in the color quality may be compensated after film 12 is digitized.

Illumination system 90 also comprises a first and second output lens system. Each output lens system comprises several components, including a microoptic illumination flattener 112, a collimating lens 114 and a diffuser 116. Microoptic illumination flatteners 112(a) and 112(b) each functionally flatten the colorized light beam input into the output lens system, while collimating lenses 114(a) and 114(b) each collimate the colorized light beam flattened by their respective microoptic illumination flatteners 112(a) and 112(b). Finally, diffusers 116(a) and 116(b) diffuse their respective collimated and flattened colorized light beams. It should be noted that microoptic illumination flatteners 112(a) and 112(b), collimating lens 114(a) and 114(b) and diffusers 116(a) and 116(b) may have alternate arrangements and positions relative to one another without impacting on their functionality.

Furthermore, illumination system 90 comprises a first and second coupling system for coupling each of the first, second and third color filters with the output lens system. Each coupling system comprises a fold mirror 118. Fold mirrors 118(a) and 118(b) both transmit one of the colorized light beams to their respective output lens system.

Figure 5A:
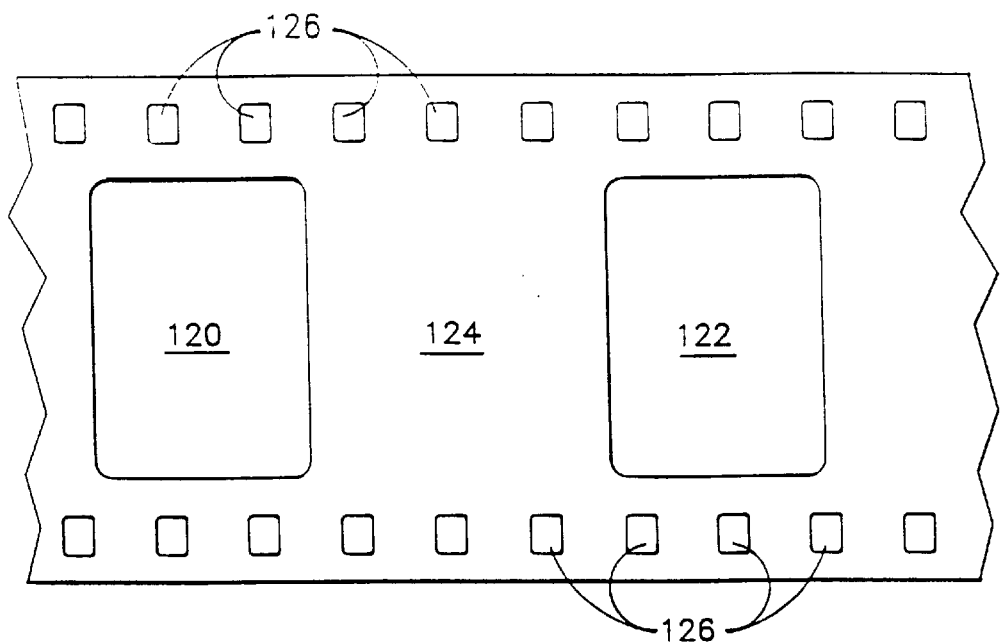
FIGS. 5(a), 5(b) and 5(c) illustrate a top view of two recorded images on a film, and cross sectional views of a first and second component of a fifth embodiment of the present invention, respectively.

Referring to FIG. 5(a), a top view of two recorded images or frames, 120 and 122, are illustrated for the purposes of a fifth embodiment. Recorded images 120 and 122 are attached to a base film 124 and have a predetermined spacing. To facilitate its feeding within a telecine, a plurality of coordinated positional tags or sprocket hole tags 126 are incorporated in base film 124. Each sprocket hole tag of the plurality have a uniform size, rectangular shape, and uniformly spaced from each other.

Figure 5B:
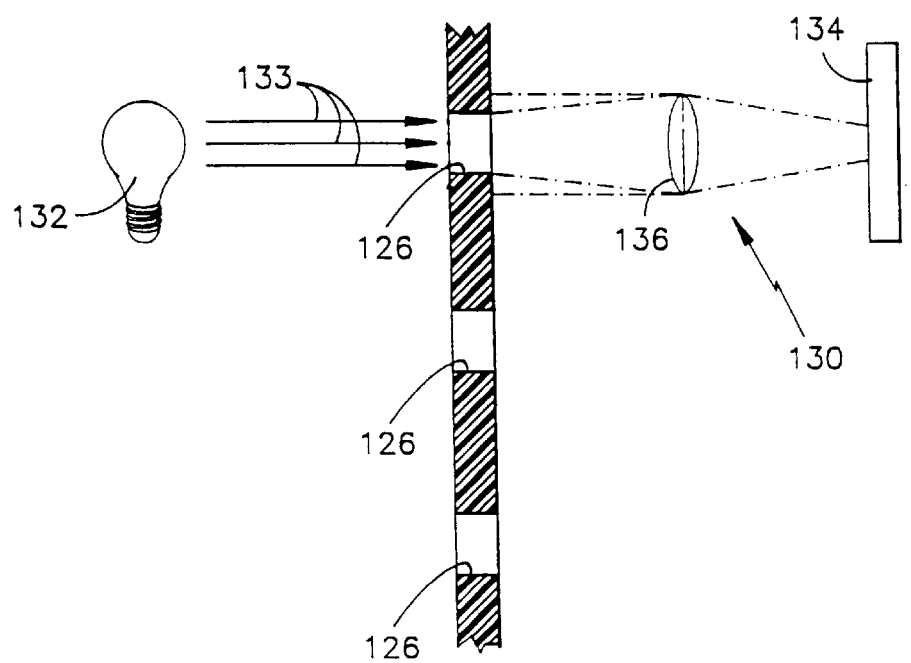
Figure 5C:
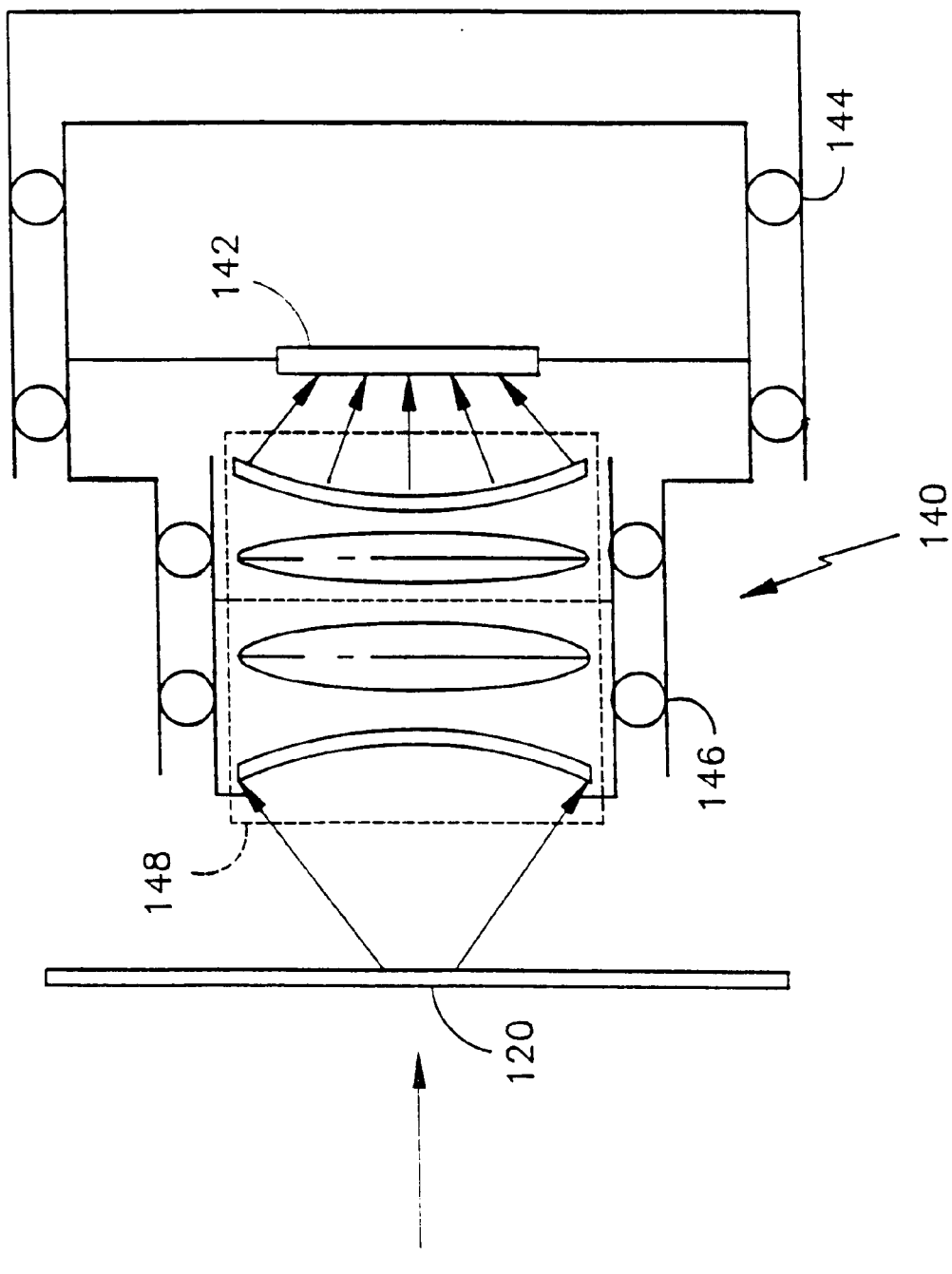

Referring to FIG. 5(b), a first component of an alignment system is illustrated. In operating any known parallel telecine structure, the positioning of the recorded image relative to digitizing camera is of critical importance. As such, the alignment system comprises a position sensor system 130 for detecting the position of the sprocket hole tag 126, or more specifically, the X and Y coordinates of a first, second, third and fourth edge of the sprocket hole tag according to an X and Y axis. It should be noted that with the coordinates of one edge detected, the remainder may be simply calculated, assuming each tag 126 has a known size, shape and spacing. Additionally, the alignment system comprises an alignment mechanism 140, as shown in FIG. 5(c).

To detect the edges of the sprocket hole tag 126, position sensor system 130 comprises a light source 132. Light source 132 generates a light beam 133 having a light intensity for illuminating each sprocket hole tag 126. As a result of this configuration, the rear face of each sprocket hole tag 126 is illuminated and a portion of light beam 133 passes through each sprocket hole tag 126.

Position sensor system 130 further comprises a sensor camera 134, preferably a Charge Coupled Device ("CCD"). Functionally, sensor camera 134 detects that portion of light beam 133 passing through the rear face of each sprocket hole tag 126 and projected onto the sensor 134 itself. A portion of light beam 133, it should be noted, is not projected onto camera 134 due to tag 126. In response to the portion of the light beam detected by sensor camera 134 and that portion not projected onto camera 134, the positions of the four edges of each sprocket hole tags are detected by a system (not shown) for determining the edge coordinates basing its calculations on transitions in the detection of light.

In an alternate embodiment of the present invention, position sensor system 130 further comprises an optical lens system 134 for directs and projects the portion of light beam 133 passing through tag 126 at light intensity detector 136.

Referring to FIG. 5(c), alignment mechanism 140 is illustrated from a cross-sectional view. Alignment mechanism 140 functionally aligns digitizing camera 142 relative to recorded image 120 in view of the first and second edges detected by position sensor 130. This is realized by incorporating a first and second translating mechanism, 144 and 146. First translating mechanism 144 configures digitizing camera 142 with respect to recorded image 120. Further, second translating mechanism 146 positions a lens structure 148 relative to the digitizing camera 142.

In an alternate embodiment, the alignment system incorporates both a focus adjustment device (not shown) for focusing each recorded image and a magnification adjustment device (not shown) for magnifying each recorded image.

Figure 6:
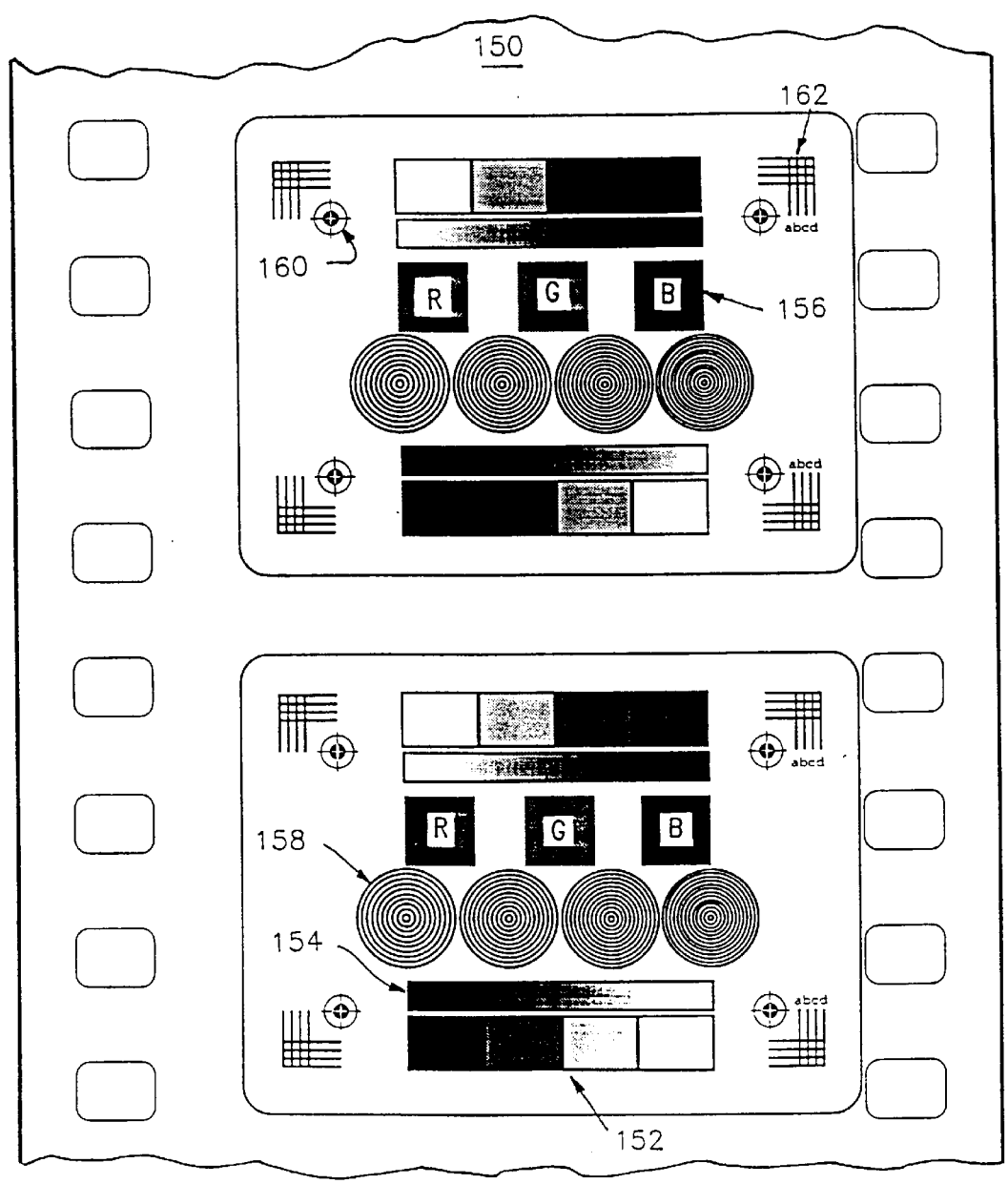
FIG. 6 illustrates a calibration scheme for calibrating the present invention.

Referring to FIG. 6, a Digital Archive Calibration Frame ("DACF") 150 is illustrated. DACF 150 is functionally incorporated for the purpose of calibrating each camera sensor relative to one another during the digitization process detailed hereinabove. Practically, a first set of DACFs 150 are positioned at the beginning of the film reel, and a second set at the end of the film reel. Each DACF in each set is read by each camera sensor so as to calibrate different aspects of the telecine during the digitization process. By this arrangement, fluctuations in the gray or color scale between cameras are detected using a group of patterns on DACF 150 and compensated for accordingly once digitization of the film is completed. Similarly, fluctuations in the frame magnification between cameras are also detected using a further group of patterns on DACF 150. To simplify the process of making the first and second DACFs, in the preferred embodiment, the patterns required for calibrating gray scale, color scale and magnification are all incorporated on a singular DACF and are further detailed below.

Each DACF 150 comprises a series of flat gray level fields 152, as well as a continuous gray level field 154. Both series of fields 152 and continuous field 154 are employed to calibrate any variation in the gray scale between parallel telecine cameras. This is realized by detecting the fields using the parallel telecine structure detailed hereinabove, and comparing this data once digitized with digitized data of another telecine camera. By this arrangement, fluctuations can be compensated for accordingly.

In the preferred embodiment of the present invention, to further assist the series of fields 152 and the continuous field 154, additional calibrating frames (not shown) are also employed prior to and in conjunction with the first and second sets of DACFs 150. To provide further support in calibrating the film to be digitized, these additional calibrating frames comprise a first and second test frame (not shown). The first test frame comprises a black level or zero transmissivity, and a second test frame comprises a reference gray scale, or approximately 50% transmissivity.

Additionally, each DACF 150 also comprises a R-G-B color reference grouping 156. As with both series of fields 152 and continuous field 154, color reference grouping 156 is employed to calibrate variation in red, green or blue colors between parallel telecine cameras and compensate for DC drift. This is realized by detecting the each color of color reference grouping 156 using the parallel telecine structure detailed hereinabove, and comparing this data once digitized with digitized data of another telecine camera. Again, by this arrangement, fluctuations can be compensated for accordingly.

To insure that the magnification of each telecine camera is calibrated with each other from reel to reel of the film, each DACF 150 further comprises a magnification pattern set 158. Magnification pattern set 158 includes four circular patterns. Each circular pattern of set 158 comprises a series of non-intersecting, enclosed circles each having a diameter. Each circle from the series of circles is uniformly spaced apart from an adjacent circle(s) such that each diameter of each circle is reduced by a uniform distance relative to an adjacent circle. However, the uniform spacing or distance of each circle of the series are distinct from all other patterns of set 158.

With each pattern having a distinct spacing arrangement, a two dimensional Fast Fourier Transform ("FFT") may then be performed by a computer (not shown) to properly calibrate the magnification of each camera relative to each other. Executing an FFT on each pattern results in a circle having a single diameter for each pattern. This single diameter is a proportional representation to the spacing between circles of the relevant pattern of set 158. With the size of the circle of a pattern of set 158 determined, the singular diameter can be measured accordingly using a scanning system or computer.

It should be noted that alignment check fiducials 160 and aperture crop guides 162 are also employed on each DACF 150. Fiducials 160 and guides 162 are both incorporated to assist in aligning the relevant frame with respect to the relevant camera.

Moreover, it should be also noted that the present invention, as stated herein, enables the correction of errors and flaws in the state of the recording equipment, the illuminator, exposure conditions, color quality and the state of the film during post processing. Various means are available that will realize this embodiment including a simple computer capable of tracking through the various data derived through the digitization process. Similarly, a table of correction data may be assembled during or after the digitization process to assist the computer in compensating and correcting the digitized data.

It should be noted that in another embodiment of the present invention, the calibrating system calibrates a gray scale, color scale, or magnification scale of a first camera sensor of a first digitizer with a second camera sensor of a second digitizer. By this design, the first and second digitizers both digitize the same reference pattern from the DACF. Further, the calibration system also comprises a computer system (not shown) for compensating for fluctuations in the gray scale, color scale, or magnification scale between the first camera sensor of the first digitizer and the second camera sensor of the second digitizer in response to the reference pattern of the test frame digitized by the first and second digitizers. In a further embodiment, a data storage means (not shown) is also incorporated for storing the reference pattern data digitized by both the first and second digitizers.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, while a two phase parallel telecine is detailed herein, it should be apparent that a multiphase parallel telecine can similarly be derived using the teachings herein. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. An alignment system for aligning a camera sensor with a plurality of recorded images in a parallel telecine, each recorded image of the plurality comprising a sprocket hole tag, the alignment system comprising:
- a light source for illuminating said sprocket hole tag of each recorded image of the plurality with a light beam having an intensity such that a rear face of said sprocket hole tag is illuminated;
- a light intensity detector detecting a first and a second transition in said intensity in said rear face of said sprocket hole tag;
- a system for calculating a first and a second edge of said sprocket hole tag in response to said first and said second transitions in said light intensity illuminating said sprocket hole tag;
- a first translating mechanism for translating said camera sensor with respect to said each recorded image of the plurality; and
- a second translating mechanism for translating a lens with respect to said camera sensor, wherein said first and said second translating mechanisms are mechanically controlled in response to said first and second transition in said light intensity.

2. The alignment system of claim 1, further comprising:
- a focus adjustment device for focusing each recorded image of the plurality; and
- a magnification adjustment device for magnifying each recorded image of the plurality.

3. The alignment system of claim 1 wherein said camera sensor comprises a charge couple device.

* * * * *